Patented Sept. 8, 1925.

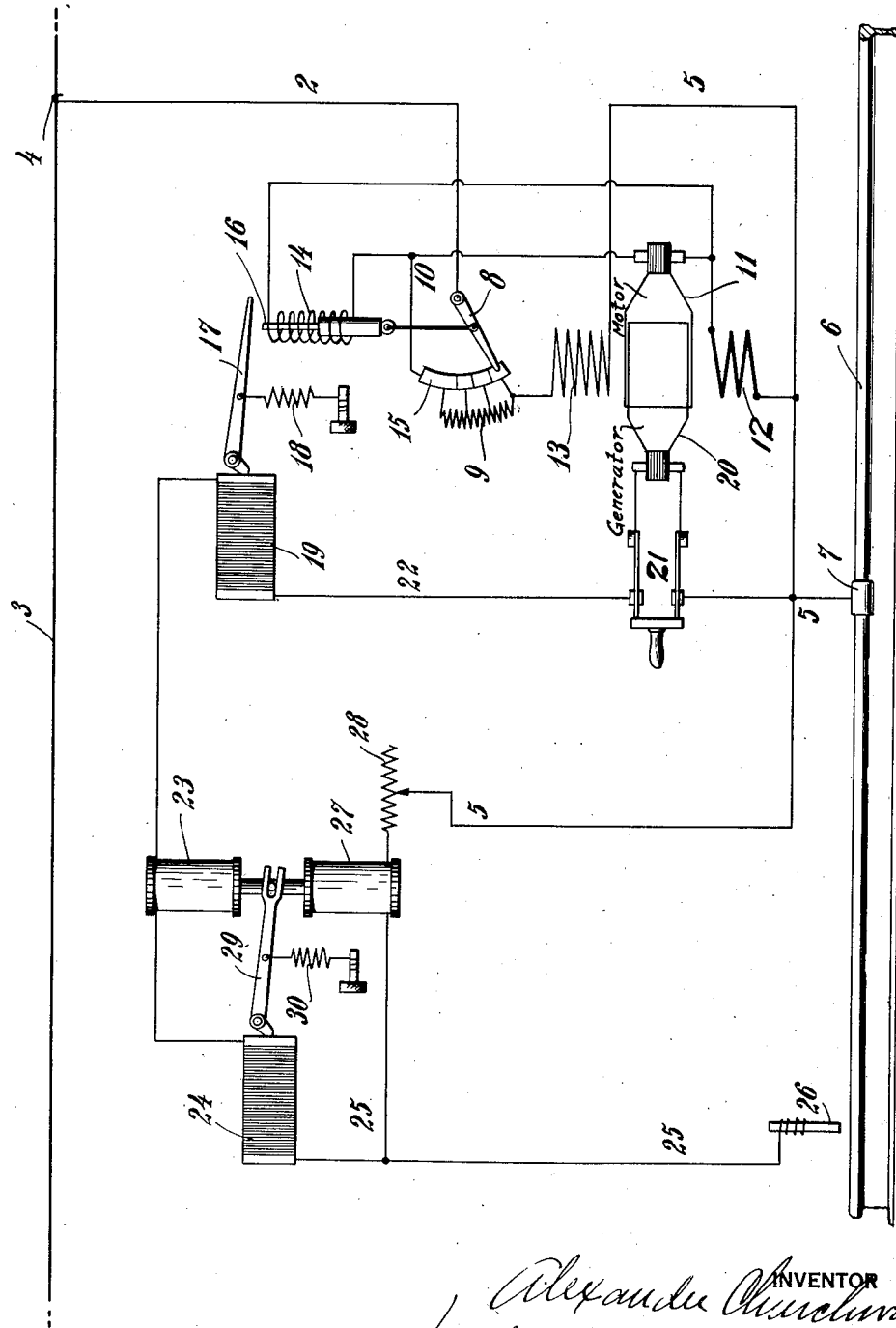

1,552,418

UNITED STATES PATENT OFFICE.

ALEXANDER CHURCHWARD, OF NEW YORK, N. Y., ASSIGNOR TO WILSON WELDER & METALS COMPANY, INC., A CORPORATION OF NEW YORK.

ELECTRICAL WELDING METHOD AND APPARATUS.

Application filed April 22, 1919. Serial No. 291,885.

*To all whom it may concern:*

Be it known that I, ALEXANDER CHURCHWARD, a citizen of the United States, residing at New York city, county of New York, State of New York, have invented a certain new and useful Improvement in Electrical Welding Methods and Apparatus, of which the following is a specification.

This invention relates to an electrical welding method, and apparatus for practicing it; and particularly to arc-welding. That embodiment of the invention illustrated by the accompanying drawing and particularly described herein, is especially adapted to arc-welding the rail-bonds of electric railways by energy derived from the traction power circuit of the railway.

Objects of the invention are to attain facility of operation and reliability of welding action, particularly by compensating for variance of the factors which generally affect the weld, such as variations in the length of the welding arc and the voltage received from the source of energy. To accomplish these results with relatively cheap, simple and reliable apparatus, is another object of the invention.

In the accompanying drawings, the illustrated welding apparatus is assumed to be mounted on a railway hand-car, or otherwise suitably arranged for portability along a railway track. It derives its power from a wire 2 connected with the trolley-wire or third-rail 3 through a hook 4 or other suitable contact device, and a wire 5 connected with the grounded track-rail 6 through a spring contact clip 7. In the illustrated instance, the traction motive power consists in a direct current which, when the foregoing connections are established, flows from the wire 2 through the wiper 8 of the motor-starting-box and, initially, through all sections of the starting-box resistance 9 and through the wire 10 and the motor-armature winding 11 of the dynamotor, and thence through the dynamotor series field coil 12, wire 5, and contact clip 7 to the track rail 6. Simultaneously current flows from the wiper 8 through the long-shunt dynamotor field coil 13 to the ground wire 5. Simultaneously current flows from the wire 10 through the relatively high-resistance solenoid 14 in shunt with the motor armature 11, whereby the solenoid is subjected always to the difference of potential existing across the motor-aramature terminals.

When the foregoing currents are established, the I. R. potential drop across the motor armature 11 is very small, and insufficient to cause the solenoid 14 to raise its core; but as the dynamotor speeds up, its motor counter E. M. F. gradually rises and thus gradually increases the potential difference across its motor brushes, so as to gradually increase the energization of the solenoid 14 and thus cause it to gradually raise its core and the wiper 8 therewith connected. As the wiper 8 is thus gradually shifted, it gradually cuts out from the motor armature circuit the starting resistance 9; the effect of the combined actions being to gradually increase the motor speed to normal value, without an excessive starting current.

When the dynamotor has thus attained full speed, and the solenoid 14 has thus raised the starting wiper 8 into contact with the last segment 15 of the resistance-commutator, a non-magnetic extension 16 on the solenoid core engages and upwardly thrusts upon the outer end of the pile-regulating lever 17 so as to oppose the moment of the spring 18 thereon tending to compress the pressure-variable resistance pile 19. The last resistance segment 15 is long enough to permit a considerable rise of the solenoid core in the act of lifting the lever 17, without breaking contact between the segment 15 and wiper 8.

The generator armature 20 of the dynamotor delivers current through the main switch 21 to the welding circuit which may be traced as follows: from the track rail 6, through the contact clip 7, wire 5, one arm of the main switch 21, generator winding 20, the other arm of the main switch 21, wire 22, power-line-compensating resistance pile 19, series arc-regulating solenoid 23, arc-regulating resistance pile 24, wire 25; and thence in parallel through two circuit branches back to the generator winding; one branch leading through the welding electrode 26, track-rail 6, and spring clip 7 to the wire 5; and the other branch leading through the shunt arc-regulating solenoid 27 and adjustable resistance 28 to the wire 5; whereby the shunt arc-regulating solenoid 27 will always receive an amount of current proportional to the potential difference between the welding electrode and the track rail, and determined by the adjustable resistance 28. The shunt arc-regulating solenoid 27 will have a high resistance relative to the maximum resistance of the welding arc, so that in no event will it subtract a substantial current component from the arc.

The cores of the series and the shunt arc-regulating solenoids are connected together so as to pull against each other, and their differential or resultant pull is transmitted to the end of the pile-compressing lever 29, for instance by means of a pin projecting from the solenoid cores into a slot in the lever end, as indicated. An adjustable regulating spring 30 exerts a continuous pile-compressing moment on the lever.

The power-line voltage existing between the trolley-wire and the track rail, varies considerably, and it is the function of the power-line-compensating pile 19 to compensate for the effects of such variations in the welding circuit. The desired compensation can be effected for all power-line voltage variations between certain minimum and maximum limits, and the solenoid 14 is so designed that its lever actuating extension 16 will just lightly engage the pile-compressing lever 17 when the dynamotor attains its full speed for the minimum power-line voltage. Under this running condition a given minimum welding voltage is developed by the generator winding 20, and the full pile-compensating effort of the spring 18 will be effective on the lever 17 to reduce the pile resistance 19 to its minimum value. As the power-line voltage rises above its said minimum, the welding voltage generated by the armature winding 20 rises accordingly, while the energization of the solenoid 14 is correspondingly increased with the increased potential difference between the terminals of the motor armature 11, so as to correspondingly increase the upward pressure on the lever 17 and thus further counteract the pile-compressing effort of the spring 18 to permit the pile to expand and correspondingly increase its resistance. This increase in the resistance of the power-line-compensating pile is of course graduated in accordance with the rise in the power-line voltage so as to approximately compensate the concurrent voltage rise in the welding circuit, and thus more nearly approximate the effect of a constant-potential source of welding current.

When the power-line circuit driving the motor armature 11 is in any way opened, the solenoid 14 of course releases its core which restores the starting-resistance wiper 8 to initial position to prevent excessive current in the motor armature when its circuit is reestablished.

When the dynamotor is running, and the welding electrode 26 is brought into contact with the track-rail or the bond thereon which is to be welded to the rail, the shunt arc-regulating solenoid 27 is short-circuited and the full attraction of the relatively low-resistance series arc-regulating solenoid 23 becomes effective to oppose the pile-compressing effort of the adjustable regulating spring 30. Under this condition the arc-regulating pile 24 is subjected to minimum compression so as to introduce a maximum resistance into the welding circuit, permitting only a given minimum current between the welding electrode and the track-rail, just sufficient to initiate the welding arc when the electrode is drawn out of contact. As the welding electrode is drawn out of contact with the track-rail and bond, so as to produce the welding arc, the potential across the arc is of course applied to the shunt circuit-branch through the relatively high-resistance arc-regulating solenoid 27, so that the current in this solenoid, and its pile-compressing effect, are gradually increased as the arc is lengthened. Concurrently, of course, the current in the series arc-regulating solenoid is reduced by the resistance of the welding arc; and the design of the opposed solenoids, and the adjustment of the regulating rheostat 28, can be and preferably are so determined that the resistance-reduction effected in the pile 24 by increased compression from the differential action of the solenoids, more than compensates the resistance-increase and counter E. M. F. introduced into the welding circuit by the welding arc itself, so that the welding current flowing in the arc will not only rise to full efficient welding intensity when a short arc is established, but will actually increase as the length of the arc is increased. This increase of current intensity with the increase in length of the welding arc, contributes the very important advantage of intensifying the total welding or fusing heat of the arc to compensate for the extension of the anode surface as the arc is lengthened. That is to say, as the arc is lengthened, its heating effect spreads over a greater anode surface so that it is necessary to increase the total current in order to approximate a constant heating and fusing effect per unit of surface affected.

When the arc is drawn to such length that it breaks, the shunt arc-regulating solenoid of course receives maximum current, while its opposed series arc-regulating solenoid receives minimum current, and the arc-regulating pile 24 is consequently subjected to maximum compression so as to introduce minimum resistance into the welding circuit. It might be surmised that this condition of minimum pile resistance would result in excessive current flow at the instant of bringing the welding electrode again into contact with the rail or rail-bond, but it has been found that the inductance of the series solenoid 23 effectually checks the current rise until the resistance-increasing action of the solenoid on the pile has become effective, while at the same time the resistance-reducing action of the opposed shunt solenoid 27 is eliminated by short-circuiting action of the contact between the welding electrode and the track-rail.

In actual welding operations, fluctuations in the weld due to the variable line voltage and variable length of the arc are quite rapid, often occurring at a rate exceeding thirty times per second. It is necessary, therefore, to use a sensitive and a rapidly responsive compensator. The pressure controlled non-graduated pile fulfills the necessary requirements and it has been found in practice that such a compensator will instantaneously respond to all micro-increments and decrements occurring in said line voltage as well as in the conductance of the arc.

The result of the operation of the entire apparatus is to automatically compensate for variations both in the power-line voltage, and in the length and resistance and counter E. M. F. of the welding arc. One important consequence is the increased facility with which efficient welding can be accomplished by operators possessing less skill than has been heretofore required.

It is desired to emphasize the fact that the rudiments and principles of the invention can be applied and practiced in many constructions and arrangements of apparatus different from the illustrated example, some of which different adaptations will be within the ordinary knowledge and skill of technicians, and others of which may be inventively devised, within the spirit and generic definitions of the following claims.

I claim:

1. An electric arc welding apparatus comprising a pair of electrodes, a welding circuit, a variable resistance, means for supplying current to said circuit, and coupled electroresponsive means adapted to cooperate with said variable resistance to maintain a constant heating effect per unit of electrode area of the work affected irrespective of the length of the arc.

2. The method of electrical arc welding which consists in establishing the welding arc, and automatically increasing the strength of its current as the length of the arc increases and vice versa.

3. The method of electrical arc welding which consists in transmitting current between the welding electrode and the part to be welded, and automatically increasing the strength of said current as the length of the arc increases and vice versa by regulating means functioning in connection with coupled cooperative means responsive to all micro increments and decrements in the potential difference between said electrode and part to be welded.

4. An arc welding apparatus comprising a mechanism adapted to automatically increase the current through the arc as the length of the same is increased, the current through the arc when long being greater than that through the arc when shorter.

5. The method of electrical arc welding which consists in transmitting current through a pair of coupled cooperative electroresponsive devices adapted to control a current regulating means, said responsive devices being connected respectively in series and in shunt with the welding arc, and increasing and decreasing the voltage applied to the arc through the instrumentality of the electroresponsive devices as the arc is lengthened and shortened respectively.

6. The method of electrical welding which consists in employing coupled electroresponsive devices utilizing the opposed influences of currents flowing therethrough respectively in series with the welding arc and in shunt therewith, to increase and decrease the flow of current in the welding arc as the arc is respectively lengthened and shortened.

7. The method of electrical welding which consists in employing coupled electroresponsive devices utilizing the opposed influences of currents flowing therethrough respectively in series with the welding arc and in shunt therewith, to govern resisting means for increasing and decreasing the flow of current in the welding arc as the length of the arc is respectively decreased and increased.

8. The method of electrical welding which consists in employing coupled electro-responsive devices utilizing the opposed influences of currents flowing therethrough respectively in series with the welding arc and in shunt therewith, to control a variable resistance in series with the welding arc and consequently effect an increase and decrease in the flow of current through the arc as the same is respectively decreased and increased.

9. The method of electrical welding which consists in converting electrical energy from a variable-potential source into an electrical welding current whose potential varies with the potential of said source, and employing said potential variations of said source to control current regulating means tending to compensate the consequent potential variations in the welding current.

10. The method of electrical welding which consists in converting electrical energy from a variable-potential source into a welding current whose potential varies with the potential variations of said source, and employing said potential variations of the source to control a variable resistance in circuit with the welding current to compensate the said consequent variations in its potential.

11. The method of electrical welding which consists in converting electrical energy from a variable-potential source into a welding current whose potential varies with the variations of source potential, and employing said variations of source potential to compensatively govern welding-current-regulating means, while also employing welding-current variations produced by changes in the welding resistance to govern welding-current-regulating means for compensating said resistance variations.

12. An electrical welding circuit including microsensitive current-regulating means and cooperative electro-responsive means in joint control thereof and connected both in shunt and in series with the current path through the weld.

13. Electrical arc-welding apparatus comprising an arc-welding circuit and microsensitive current-regulating means in control thereof and including cooperative coupled controlling coils in shunt and in series respectively with the welding arc and responsive to an increase in its shunt current to increase the potential effective on the arc.

14. Electrical arc-welding apparatus comprising an arc-welding circuit and current-regulating means in control thereof and including two controlling coils respectively in series and shunt with the welding arc at all times and arranged in joint control of said current-regulating means to increase the potential effective on the arc in response to an increase in its length.

15. Electrical arc-welding apparatus comprising an arc-welding circuit including a micro-sensitive variable resistance in series with the welding arc, and an electro-responsive resistance-controlling device connected both in shunt and in series with the arc and responsive to gradual changes in arc voltage to jointly, gradually and smoothly reduce and increase said variable resistance.

16. Electrical arc-welding apparatus comprising an arc-welding circuit, a variable resistance therein in series with the welding arc, and electro-responsive means in control of said resistance and including two electro-magnetic coils respectively in series and in shunt with the welding arc and jointly controlling the variable resistance so that current in the series coil tends to increase the resistance while current in the shunt coil tends to reduce the variable resistance.

17. Electrical arc-welding apparatus comprising an arc-welding circuit, a compression-variable resistance therein in series with the welding arc, and compression-varying means in control of said resistance and including two electro-magnetic coils respectively in series and in shunt with the welding arc and jointly controlling the pressure on said resistance by opposed differential effort so that current in the shunt coil tends to compress the resistance while current in the series coil tends to relieve its compression.

18. Electrical arc-welding apparatus comprising an arc-welding circuit, a compression-variable resistance therein in series with the welding arc, and compression-varying means in control of said resistance and including two electro-magnetic coils respectively in series and in shunt with the welding arc and jointly controlling the pressure on said resistance by opposed differential effort so that current in the shunt coil tends to compress the resistance while current in the series coil tends to relieve its compression, and a resilient member continuously tending to compress the resistance.

19. Electrical welding apparatus comprising electrical energy-translating means adapted to deliver a welding output current, a welding circuit arranged to receive the output current therefrom, a variable resistance in said welding circuit, and electro-responsive means in control of said resistance and arranged to be governed by variations in the electrical potential impressed on the input circuit of said energy-translating means.

20. The method of electrical arc welding which consists in establishing the welding arc and progressively increasing the intensity of the arc current as the length of the arc is increased.

21. The method of electrical arc welding which consists in establishing the welding arc and progressively increasing the intensity of its current as the arc length increases, and in a degree to approximate a constant heating effect per unit of electrode area of the work.

22. The method of electrical arc welding which consists in establishing the welding arc and employing its electrode-voltage variations due to its length variations to automatically vary the intensity of its current directly with its said length variations.

23. An electrical arc welding apparatus comprising an arc welding circuit, means for supplying current to said circuit, automatic means in said circuit to compensate the effect of variations in the potential of the supply means, and means responsive to the resistance of the arc to vary the current flowing through the arc.

24. An electrical arc welding apparatus comprising an arc welding circuit, means for supplying current to said circuit, and means to maintain a constant heating and fusing effect per unit of electrode area of the work irrespective of the length of the arc, the latter named means including jointly operating controlling coils in shunt and in series respectively with the current through the weld.

25. In an electrical arc welding apparatus, a source of current supply, an energy translating device connected with said current supply and delivering current to a welding circuit, a variable resistance in said welding circuit responsive to fluctuations in the voltage of the current source for reducing the variations which would otherwise be communicated to the voltage delivered to the welding circuit, and current controlling means in said welding circuit responsive to variations in the length of the arc.

26. In an arc welding system, the combination with a pair of electrodes, of a variable resistance in circuit with said electrodes, and means responsive to the voltage across said electrodes for decreasing the said resistance as the electrodes are separated, the variable resistance being in circuit and of a minimum effective value when the electrodes are separated and the arc is extinguished.

27. In an arc welding apparatus comprising in combination, a pair of electrodes between which an arc is adapted to be formed, a variable resistance in circuit with said electrodes, mechanism for increasing said resistance when the electrodes are brought together, and for decreasing said resistance when the same are separated, said mechanism comprising series and shunt positively connected devices acting in opposition.

28. An arc welding apparatus comprising a pair of welding electrodes, a variable resistance in circuit with electrodes, a mechanism adapted to control said resistance, said mechanism being connected across the electrodes regardless of whether or not the arc is formed, and whether or not the electrodes are separated, and a resilient member also adapted to operate said resistance in substantially the same direction as said mechanism.

29. An arc welding apparatus comprising a pair of electrodes, a variable resistance in series with the electrodes, a solenoid in series with said resistance and adapted to mechanically control the resistance, a shunt solenoid connected across some portion of the main circuit adapted to mechanically oppose the action of the first mentioned solenoid and control said resistance, and means in cooperation with said solenoids and also normally tending to oppose the action of the first mentioned solenoid.

30. In an arc welding circuit, the combination with a control rheostat, of means responsive to voltage across said arc for operating the rheostat to lower the effective resistance thereof, and an inductance in circuit with said arc to limit the initial flow of current, the resistance being less than a maximum at the time of such initial flow.

31. In an arc welding apparatus, the combination with a pair of electrodes, of a variable resistance in series therewith, means responsive to the voltage across some portion of the main circuit for decreasing the effective value of said resistance as said electrodes are separated, but said decrease in resistance being greater than the increase in resistance due to the increase in length of the arc.

32. Electrical welding apparatus comprising an arc welding circuit, a compression variable resistance therein in series with the welding arc, and compression varying means in control of said resistance and including two electro-magnetic coils respectively in series and in shunt with the welding arc and jointly controlling the pressure of said resistance by opposed differential effort, so that the current in the shunt coil tends to compress the resistance, while the current in the series coil tends to relieve its compression, and means continuously tending to compress the resistance.

In testimony whereof, I have affixed my signature to this specification.

ALEXANDER CHURCHWARD.